United States Patent [19]
Frayssinoux

[11] 3,747,302
[45] July 24, 1973

[54] DEGASSERS
[75] Inventor: Roland Frayssinoux, Paris, France
[73] Assignee: Compteurs Schlumberger, Montrouge, France
[22] Filed: Apr. 7, 1972
[21] Appl. No.: 242,063

[30] Foreign Application Priority Data
Apr. 7, 1971  France .................................. 712244

[52] U.S. Cl. ....................... 55/164, 55/170, 55/463, 210/436
[51] Int. Cl. ............................................. B01d 19/00
[58] Field of Search ...................... 55/159, 164, 165, 55/170, 202, 206, 463, 525; 210/436

[56] References Cited
UNITED STATES PATENTS
| | | | |
|---|---|---|---|
| 2,414,158 | 1/1947 | Mock ............................... | 210/436 X |
| 3,273,313 | 9/1966 | Livesey et al. ........................... | 55/46 |
| 3,581,464 | 6/1971 | Bhuta ..................................... | 55/43 |

OTHER PUBLICATIONS
"Capillary Systems For Storable Propellants," Martin Co., Denver, Colo. pp. Title, 3, 5, 6, 19, 33. 1967

*Primary Examiner*—Samih N. Zaharna
*Assistant Examiner*—Richard W. Burks
*Attorney*—William R. Sherman et al.

[57] ABSTRACT

A degasser comprises vertically disposed inlet and outlet tubes, which are aligned with each other and which have their adjacent ends spaced apart to define a gap. An annular chamber surrounds the adjacent ends of the tubes so as to contain this gap. The inlet tube, which is beneath the outlet tube, contains a plurality of inverted conical filters, the periphery of the uppermost filter being secured around the periphery of the lower end of the outlet tube. As a liquid containing bubbles enters the inlet tube of the degasser, the liquid passes through the filters to the outlet tube, but the bubbles are deflected radially outwardly and upwardly by the undersides of the filters, and enter the chamber via the gap.

8 Claims, 1 Drawing Figure

PATENTED JUL 24 1973 3,747,302
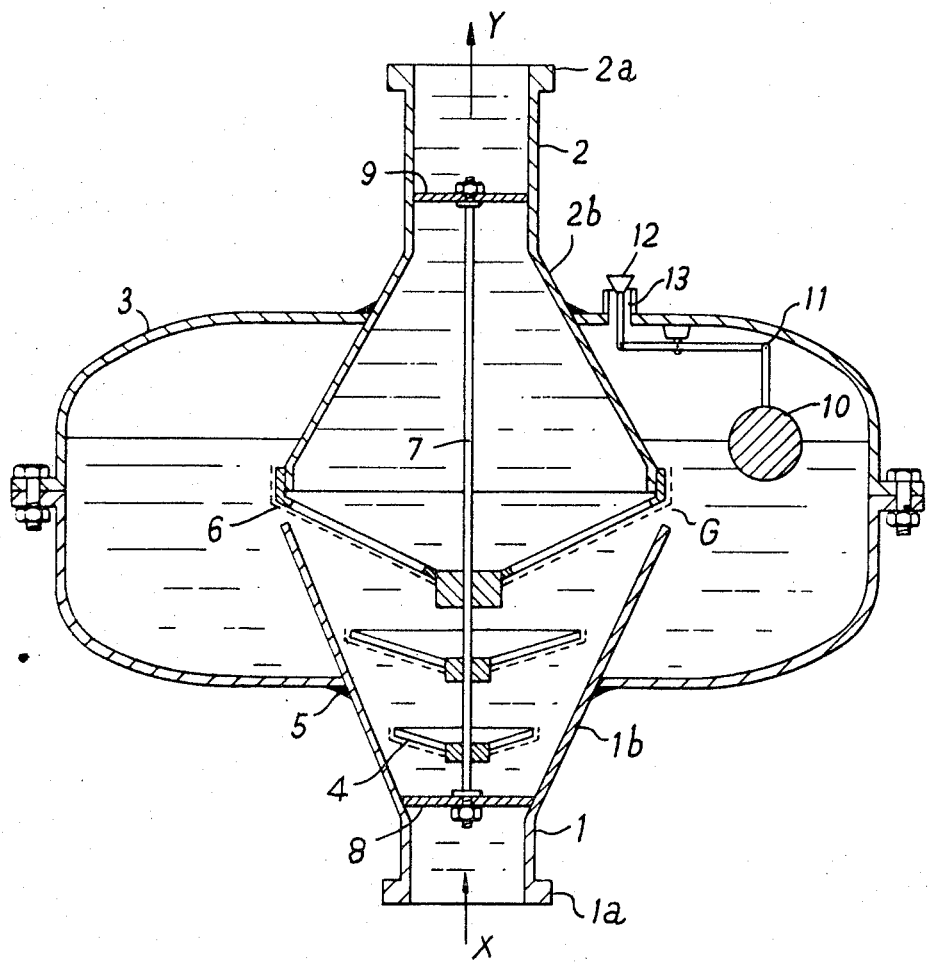

DEGASSERS

The present invention relates to an improved degasser, in particular for separating from a flowing liquid the gas bubbles that it contains before measuring it.

Conventional degassers make use of the upward speed of the gas bubbles at the interior of a liquid mass. For this purpose, they are generally constituted by containers of large diameters, at the interior of which the speed of the fluid is small and in a direction opposite to the upward speed of the gas bubbles. It is apparent that the conventional degassers have their efficiency reduced by reason of the shape and of the magnitude of the velocity fields at the interior of the volume to be degassed, which turns these degassers into self-generators of gas-liquid emulsions.

The main object of the invention is to remedy this disadvantage by providing a degasser having a high efficiency and smaller dimensions than these conventional degassers.

The study of the pressures at the interior of the gas bubbles shows that due to the surface tensions, the bubbles cannot pass through a filter having judicious mesh dimensions and having a suitable orientation with respect to the sense of the flow of the fluid.

The invention takes advantage of this physical property.

According to the invention, an improved degasser is provided, in particular for separating from a liquid gas bubbles that it contains before measuring it, the degasser comprising a vertical inlet duct, an outlet duct disposed above the inlet duct as an extension of the latter, the lower end of outlet duct being spaced from the upper end of the inlet duct whereby to provide a gap therebetween, a chamber of annular shape surrounding said ducts and said gap, and a plurality of mesh filters housed in the inlet duct, the upper filter being fixed around the periphery of the lower end of the outlet duct, each filter having upwardly inclined walls such that the liquid passes through these walls whereas the gas bubbles that it contains are deflected by the walls and pass upwardly along the underside thereof and into said chamber.

Other characteristics of the invention will become apparent from the following description, given with reference to the accompanying drawing, which shows a particular embodiment of a degasser in accordance with the present invention for separating air bubbles from a liquid, and which is given by way of non-limiting example only.

The single FIGURE represents schematically the degasser in elevational section.

In the figure can be seen the inlet tubing or duct 1, in a vertical position, provided at its base with a connection flange 1a, and whose upper part 1b or diffuser is flared outwardly in the form of a cone. The reference numeral 2 designates the outlet tubing or duct disposed above the inlet tubing as an extension of the latter. The tubing 2 is provided at its upper end with a connection flange 2a, and its lower or convergent part 2b is flared out in the form of a cone. An interval or gap G is provided between the tubings 1 and 2.

A chamber of annular shape 3 surrounds the two tubings 1 and 2, at the level of their flared parts 1b and 2b, and thus contains the interval or gap G. This chamber is rigidly fastened to the two parts, by welding for example. At the interior of the flared part 1b of the tubing 1 are housed three mesh filters, respectively 4, 5 and 6. These filters have the shape of inverted cones whose apices are disposed on the common axis XY of the tubings 1 and 2. They are connected together by a rod 7 disposed along that axis and solidly fastened to the tubings 1 and 2 by cross pieces, respectively 8 and 9. The upper filter 6 is sealingly fixed around the periphery of the open lower end of the convergent part 2b. In the interior of the chamber 3, a conventional device 10, for example a float, maintains the level of the liquid constant by way of a linkage, shown diagramatically at 11, connected to a valve 12. The valve 12 in turn controls an orifice 13 communicating with the atmosphere. In the case in which the flow rate of air as a function of the flow rate of liquid is constant, the preceding device can be replaced by a simple tube of predetermined flow area leading to the atmosphere.

The principal characteristics of a degasser according to the invention will now be given:

Diameter of the tubings: $\phi$ 65 mm
Height of the flared parts: diffuser 250 mm — convergent part 87 mm
Angle at the apex of these parts: diffuser 20° — convergent part 61°
Interval between the tubings: 10 mm
Number of filters: 3
Angle at the apex of the filters: 120°
Cross section of the mesh: 0.1 to 0.3 mm
External diameter of the chamber: 240 mm
Height of the chamber: 100 mm
Minimum flow rate of liquid: 0
Maximum flow rate of liquid: 15 cubic metres per hour
Minimum diameter of the bubbles: 0.1 mm
Nature of the liquid: water The operation of the degasser shown in the drawing is as follows:

The liquid containing the air bubbles enters the upper part 1b of the tubing 1, where its axial velocity is progressively reduced due to the flaring out of the part 1b of the tubing 1. This velocity is arranged to be consistent with the loss of pressure through the filters 4, 5 and 6, having regard to the dimensions of mesh, and consequently of the air bubbles. The liquid passes through the filters 4, 5,6 and enters the outlet tubing 2, but the bubbles, under the action of the upward hydrostatic force and of the hydro-dynamic drag, are deflected radially outwardly along the undersides of the filters 4, 5, 6. They pass through the interval or gap G provided between the parts 1b and 2b and penetrate into the chamber 3, where they burst at the surface of the free level of liquid. They are then evacuated to the atmosphere through the orifice 13 controlled by the valve 12 associated with the device 10: as the level in the chamber 3 rises, the valve 12 closes to prevent the outflow of air, while as the level falls, the valve 12 opens.

Although the invention has been described with reference to a well-determined embodiment, it is not intended to be limited thereby, and modifications can be made without departing from its scope. In particular, any of the means described can be replaced by a technically equivalent means. The invention thus covers, in addition to the example described, all the variants possible.

I claim

1. A degasser for separating from a liquid gas bubbles contained in the liquid, the degasser comprising a vertical inlet duct, an outlet duct disposed above the inlet duct as an extension of the latter, the lower end of the outlet duct being spaced from the upper end of the inlet duct whereby to provide a gap therebetween, a chamber of annular shape surrounding said ducts and said gap, and a plurality of mesh filters housed in the inlet duct, the upper filter being fixed around the periphery of the lower end of the outlet duct, each filter having upwardly inclined walls, such that the liquid passes through these walls whereas the gas bubbles are deflected by the walls and pass upwardly along the underside thereof and through said gap into said chamber.

2. A degasser according to claim 1, wherein each filter has the shape of an inverted cone whose apex is disposed on the common axis of the ducts.

3. A degasser according to claim 2, wherein the cones have the same angle at their apices.

4. A degasser as claimed in claim 1, wherein the ducts have a flared out shape at the level of the annular chamber.

5. A degasser as claimed in claim 1, wherein there is provided means for regulating the level of the liquid in the annular chamber.

6. A degasser according to claim 5, wherein the means for regulating the level of liquid in the annular chamber comprises a tube of predetermined flow area leading to the free air.

7. A degasser according to claim 5, wherein the means for regulating the level of liquid in the annular chamber comprises a valve controlling communication between the chamber and the free air, and a float member operatively connected to the valve.

8. A degasser for separating from a flowing liquid gas bubbles contained in the liquid, the degasser comprising a vertically disposed inlet duct, a vertically disposed outlet duct disposed above the inlet duct, said ducts being substantially aligned with each other and having their adjacent ends spaced apart to define a gap therebetween, an annular chamber coaxially secured around the adjacent ends of the ducts and communicating with the interior of the ducts via said gap, and a plurality of spaced-apart, substantially conically-shaped filters disposed in the inlet duct, the filters being arranged coaxially of the inlet duct with their respective apices downwardly disposed, the periphery of the upper filter being sealingly fixed around the periphery of lower end of the outlet duct, whereby the liquid passes from the inlet duct to the outlet duct through the filters whereas the gas bubbles are deflected by the filters to pass radially outwardly and upwardly along the underside of the filters, and through said gap into said chamber.

* * * * *